March 21, 1950      J. A. WEST, JR      2,501,113

OPTICAL CASE

Filed Nov. 8, 1947

INVENTOR.

John A. West Jr.

BY Beau, Brooks, Buckley & Beau,

ATTORNEYS.

Patented Mar. 21, 1950

2,501,113

UNITED STATES PATENT OFFICE 2,501,113

OPTICAL CASE

John A. West, Jr., Lake View, N. Y., assignor to Westplex Corporation, Rochester, N. Y., a corporation of New York Application November 8, 1947, Serial No. 784,798

5 Claims. (Cl. 206—5)

My invention relates in general to optical cases and in particular to an optical case especially designed to hold a pair of spectacles.

The principal object of my invention is to provide a spectacle case made of one piece of material.

Another object is to provide a spectacle case made of flexible plastic molded in one piece.

Another object is to provide a spectacle case having a hinged portion of reduced thickness formed between the back wall and the closure flap to provide for necessary resiliency.

A further object is to provide a spectacle case having reinforcing ribs for stiffening the walls of the case and for providing a resting place for spectacles contained therein.

Moreover, another object is to provide a spectacle case having reinforced ribs which are secured to the rear wall thereof, thereby allowing for freedom of relative movement between the front and rear wall for easy and convenient insertion and removal of the spectacles.

Furthermore, my spectacle case is economical to manufacture and is of simple and rugged construction.

The above objects and advantages have been accomplished by the device shown in the accompanying drawings, of which:

Figure 1:
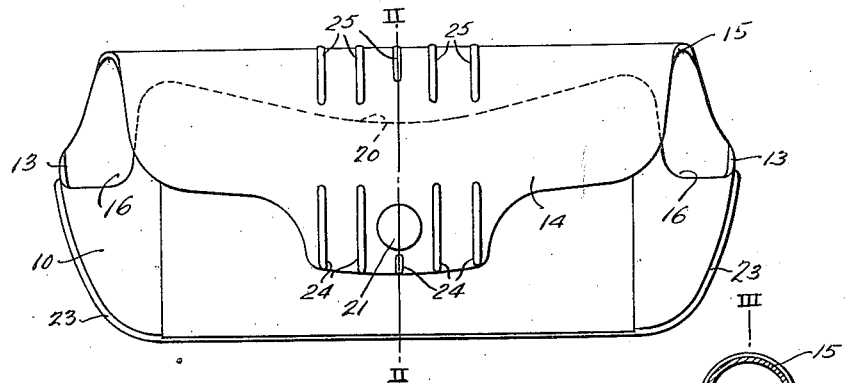
Fig. 1 is a front elevation of my complete device in its closed position.
Figure 2:
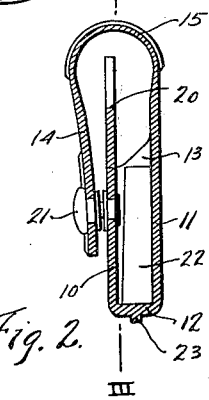
Fig. 2 is a sectional elevation thereof taken on line II—II of Fig. 1.

My device comprises a front wall 10 and a spaced back wall 11 which are joined along the lower edges by means of a bottom wall 12, having integral side walls 13, extending upwardly therefrom. My device which is formed by a molding process is made in one piece and of suitable plastic material.

Extending upwardly from the back wall 12 is a closure flap 14 which is joined to the back wall by means of a hinge portion 15. The material of the hinge portion is made thinner than the material forming the back wall, thus giving to the closure flap sufficient resiliency to be easily folded over onto the face of the front wall 10.

The upper edge of the front wall is cut away at each of its ends to provide suitable spaces 16 for the accommodation of the hinge parts of the frame of the spectacles. The upper edge 20 of the front wall between the spaces 16 is slightly curved thereby providing easy access to the spectacles contained within the case. The portion of the closure flap 14 which is superimposed upon the front wall when the case is closed is also of such width to accommodate the spectacle hinges. The flap may be secured to the front wall by any suitable fastening means, and for convenience, I have shown a snap fastener 21.

Figure 3:
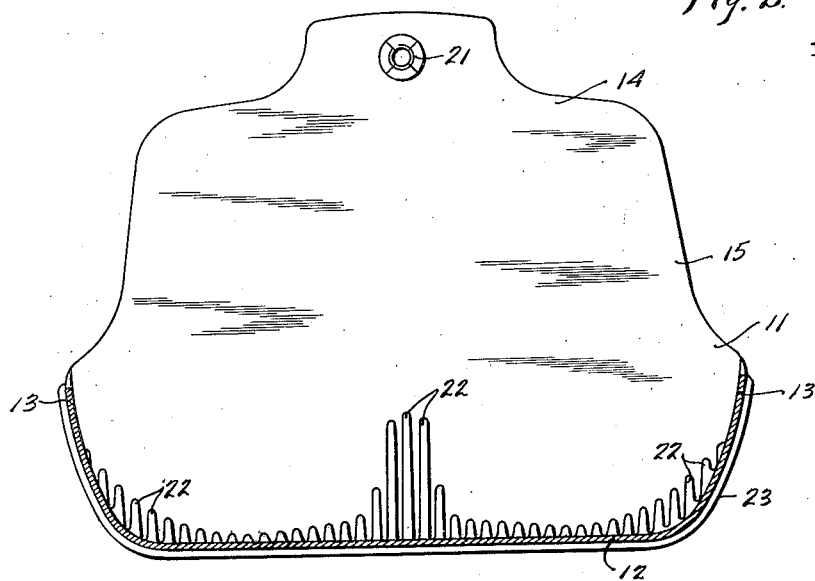
Fig. 3 is a sectional elevation with the closure flap in its extended position and taken on line III—III of Fig. 2.

In order to stiffen the front and back walls of my device, and to provide a surface upon which the spectacles or spectacle frame may rest, I provide a series of ribs 22 which are molded integrally with the back wall 11 and the bottom wall 12. These ribs project outwardly from the back wall and upwardly from the bottom wall, thus strengthening the structure but leaving the front wall free and therefore pliable. By this construction the rear wall is reinforced and made relatively rigid at the lower portion of its lateral dimension and the front wall is likewise reinforced when brought in contact with such ribs. The front wall, however, because of its separation from the ribs permits the unrestricted opening of the case when inserting or removing spectacles. It will be obvious from Fig. 3 that the ribs are of various lengths, those at the center of the case being of considerable length so as to engage the bridge of the spectacles (not shown), the successive lengths of the ribs varying from those at the longitudinal center toward each end of the case so as to provide points of contact arranged to correspond to the contour of a pair of spectacles or spectacle frame placed within the case (not shown). To further reinforce the case, a rib 23 is extended longitudinally across the lower surface of the bottom wall and up each of the side walls to the upper edges thereof. In order to reinforce the flap 14 around the area adjacent the fastening means 21, I provide a series of spaced strengthening ribs 24. I also provide a series of reinforcing ribs 25 which extend around the hinge portion 15 over that area against which the fingers of the operator are pressed when opening the fastening means.

While I have shown and described a case designed especially for receiving a pair of spectacles, it is obvious that it is within the scope of my invention to make the case of a size and shape to accommodate any other optical device. These and other modifications of the details herein shown and described may be made without departing from the spirit of my invention or the scope of appended claims.

What is claimed is:

1. An optical case formed of plastic material molded in one piece comprising a front wall, a rear wall in substantially parallel spaced relation with the front wall and forming therewith a compartment, an integral bottom wall extending across the lower edge portions of the front and back walls, the bottom wall terminating in integral side walls which serve to connect the end portions of the front and back walls, an integral closure flap extending upwardly from the top edge portion of the rear wall and joined thereto by means of a hinge portion, the flap being designed to overlap the outer surface of the front wall, and a plurality of spaced lateral ribs extending upwardly from the bottom wall of the case and being formed integrally with the bottom wall and with one of the side walls, the ribs extending across the compartment from one side wall to the other and being of various lengths so as to conform substantially to the contour of a pair of spectacles.

2. An optical case formed of plastic material molded in one piece comprising a front wall, a rear wall in substantially parallel spaced relation with the front wall and forming therewith a compartment, an integral bottom wall extending across the lower edge portions of the front and back walls, the bottom wall terminating in integral side walls which serve to connect the end portions of the front and back walls, the front wall being formed at each end with a recess for the space allowance of the projecting parts of the contents of the case, an integral closure flap extending upwardly from the top edge portion of the rear wall and joined thereto by means of a hinge portion, the flap being designed to overlap the outer surface of the front wall, and a plurality of spaced lateral ribs extending upwardly from the bottom wall of the case and being formed integrally with the bottom wall and with one of the side walls, the ribs extending across the compartment from one side wall to the other and being of various lengths so as to conform substantially to the contour of a pair of spectacles.

3. An optical case formed of plastic material molded in one piece comprising a front wall, a rear wall in substantially parallel spaced relation with the front wall and forming therewith a compartment, an integral bottom wall extending across the lower edge portions of the front and back walls, the bottom wall terminating in integral side walls which serve to connect the end portions of the front and back walls, the front wall being formed at each end with a recess for the space allowance of the projecting parts of the contents of the case, an integral closure flap extending upwardly from the top edge portion of the rear wall and joined thereto by means of a hinge portion, the flap being of substantially the same width as the width of the front wall between the recesses thereof and designed to overlap the outer surface of the front wall, and a plurality of spaced lateral ribs extending upwardly from the bottom wall of the case and being formed integrally with the bottom wall and with one of the side walls, the ribs extending across the compartment from one side wall to the other and being of various lengths so as to conform substantially to the contour of a pair of spectacles.

4. An optical case formed of plastic material molded in one piece comprising a front wall, a rear wall in substantially parallel spaced relation with the front wall and forming therewith a compartment, an integral bottom wall extending across the lower edge portions of the front and back walls, the bottom wall terminating in integral side walls which serve to connect the end portions of the front and back walls, an integral closure flap extending upwardly from the top edge portion of the rear wall and joined thereto by means of a hinge portion, the flap being designed to overlap the outer surface of the front wall, and a plurality of spaced upwardly extending ribs rising from the bottom wall and formed integrally therewith and with one of the side walls, the ribs being free of the other wall, those ribs which are disposed near the center of the case being elongated so as to engage the nose piece of a pair of spectacles and the other ribs being of such lengths as to provide supporting surface for the lense portions of the pair of spectacles.

5. A case for spectacles formed of plastic material molded in one piece comprising a front wall, a rear wall, the rear wall being extended to form a flap extensible over the front wall, the flap being of less thickness over a predetermined longitudinal area for hinged folding thereof, fastening means for connecting the flap to the front wall, one of the walls being so molded as to provide ribs along the bottom of the case for holding the walls in spaced relation and for strengthening the same, the ribs extending up one side of the case in various lengths to form a protective contour for a pair of spectacles, integrally molded ribs extending inwardly from the front edge of the flap for strengthening the case near the fastening means, and integrally molded ribs extending around the hinged portion of the flap for strengthening the same.

JOHN A. WEST, JR.

REFERENCES CITED

The following references are of record in the file of this patent:

UNITED STATES PATENTS

| Number | Name | Date |
|---|---|---|
| 1,682,719 | Aldrich | Aug. 28, 1928 |
| 2,317,302 | Roth | Apr. 20, 1943 |
| 2,423,756 | Chaplin | July 8, 1947 |
| 2,439,757 | Sidnell | Apr. 13, 1948 |